(12) United States Patent
Tripathi et al.

(10) Patent No.: US 7,923,100 B2
(45) Date of Patent: Apr. 12, 2011

(54) MULTILAYER ARTICLES AND METHODS FOR MAKING MULTILAYER ARTICLES

(75) Inventors: Sandeep Tripathi, Evansville, IN (US); Shreyas Chakravarti, Evansville, IN (US); Sapna Kirk Blackburn, Mount Vernon, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/020,634

(22) Filed: Jan. 28, 2008

(65) Prior Publication Data

US 2009/0191403 A1      Jul. 30, 2009

(51) Int. Cl.
*B32B 7/00*      (2006.01)
*B32B 27/08*     (2006.01)
*B32B 27/30*     (2006.01)
*B32B 27/36*     (2006.01)
*B32B 37/15*     (2006.01)

(52) U.S. Cl. ........ 428/213; 428/332; 428/339; 428/412; 428/480; 428/483; 428/522; 264/173.6; 264/544; 156/244.11; 156/244.24; 525/437; 525/439

(58) Field of Classification Search ........................ None
See application file for complete search history.

(56) References Cited

U.S. PATENT DOCUMENTS

| | | | | |
|---|---|---|---|---|
| 2,465,319 A | * | 3/1949 | Dickson et al. | 526/71 |
| 4,172,859 A | * | 10/1979 | Epstein | 428/402 |
| 4,180,651 A | | 12/1979 | Mark | |
| 4,259,478 A | * | 3/1981 | Jackson et al. | 528/307 |
| 4,304,899 A | | 12/1981 | Mark et al. | |
| 4,355,080 A | * | 10/1982 | Zannucci | 428/483 |
| 4,380,612 A | | 4/1983 | Mark et al. | |
| 4,554,309 A | | 11/1985 | Mark et al. | |
| 4,608,430 A | | 8/1986 | Mark et al. | |
| 4,879,355 A | * | 11/1989 | Light et al. | 525/439 |
| 4,897,448 A | * | 1/1990 | Romance | 525/67 |
| 5,010,162 A | | 4/1991 | Serini et al. | |
| 5,051,490 A | | 9/1991 | Joyce et al. | |
| 5,159,003 A | | 10/1992 | Baghaii | |
| 5,207,967 A | * | 5/1993 | Small et al. | 264/328.16 |
| 5,242,967 A | * | 9/1993 | Minnick | 524/411 |
| 5,340,907 A | * | 8/1994 | Yau et al. | 528/274 |
| 5,382,628 A | * | 1/1995 | Stewart et al. | 525/174 |
| 5,461,120 A | * | 10/1995 | Mason et al. | 525/462 |
| 5,512,632 A | | 4/1996 | Serini et al. | |

(Continued)

FOREIGN PATENT DOCUMENTS

EP           1 529 632      *    5/2005

(Continued)

OTHER PUBLICATIONS

International Search Report and Written Opinion; International Application No. PCT/US2009/031470; International Filing Date Jan. 21, 2009; Date of Mailing Mar. 27, 2009; 15 pages.

*Primary Examiner* — Vivian Chen
(74) *Attorney, Agent, or Firm* — Cantor Colburn LLP

(57) ABSTRACT

In one embodiment, the sheet, comprises: a cap layer comprising an acrylic polymer; and a base layer, wherein the sheet is thermoformable. The base layer comprises a cycloaliphatic polyester copolymer and an optionally, an aromatic polycarbonate. The cycloaliphatic polyester copolymer can comprise greater than 10 wt % cycloaliphatic diol or acid or combination thereof, based upon a total weight of the cycloaliphatic polyester copolymer.

16 Claims, 1 Drawing Sheet

U.S. PATENT DOCUMENTS

| | | | | |
|---|---|---|---|---|
| 5,783,307 A | * | 7/1998 | Fagerburg et al. | 428/412 |
| 5,804,287 A | * | 9/1998 | Hatakeyama et al. | 428/220 |
| 5,907,026 A | | 5/1999 | Factor et al. | |
| 6,136,441 A | | 10/2000 | MacGregor et al. | |
| 6,147,162 A | * | 11/2000 | Tadokoro et al. | 525/222 |
| 6,232,429 B1 | | 5/2001 | Banach et al. | |
| 6,448,334 B1 | | 9/2002 | Verhoogt et al. | |
| 6,486,251 B1 | * | 11/2002 | Patel | 524/439 |
| 6,649,104 B2 | * | 11/2003 | Tadokoro et al. | 264/171.1 |
| 6,689,863 B1 | | 2/2004 | Srinivasan et al. | |
| 6,723,768 B2 | | 4/2004 | Adams et al. | |
| 6,818,302 B2 | * | 11/2004 | Higashi et al. | 428/411.1 |
| 6,869,687 B2 | * | 3/2005 | Tadokoro et al. | 428/522 |
| 6,887,573 B2 | * | 5/2005 | Vollenberg et al. | 428/412 |
| 6,989,190 B2 | | 1/2006 | Gaggar et al. | |
| 7,087,682 B2 | * | 8/2006 | Tadros et al. | 525/437 |
| 7,199,210 B2 | * | 4/2007 | Kulkarni et al. | 528/272 |
| 7,256,228 B2 | | 8/2007 | Agarwal et al. | |
| 7,258,923 B2 | | 8/2007 | van den Bogerd et al. | |
| 7,270,882 B2 | | 9/2007 | Wang | |
| 7,375,166 B2 | * | 5/2008 | Tadros et al. | 525/437 |
| 2002/0111428 A1 | | 8/2002 | Gaggar et al. | |
| 2003/0032725 A1 | | 2/2003 | Gaggar et al. | |
| 2003/0175488 A1 | | 9/2003 | Asthana et al. | |
| 2003/0195295 A1 | | 10/2003 | Mahood et al. | |
| 2004/0220333 A1 | * | 11/2004 | Tadros et al. | 525/55 |
| 2005/0100853 A1 | * | 5/2005 | Tadros et al. | 433/6 |
| 2005/0137360 A1 | | 6/2005 | Shaikh et al. | |
| 2005/0282974 A1 | * | 12/2005 | Tadros et al. | 525/437 |
| 2006/0135690 A1 | | 6/2006 | Juikar et al. | |
| 2007/0009741 A1 | | 1/2007 | Boven et al. | |
| 2007/0148608 A1 | * | 6/2007 | Tadros et al. | 433/6 |
| 2007/0155913 A1 | * | 7/2007 | Chakravarti et al. | 525/439 |
| 2008/0004404 A1 | | 1/2008 | van de Grampel et al. | |
| 2008/0119596 A1 | * | 5/2008 | Agarwal et al. | 524/147 |
| 2008/0119597 A1 | * | 5/2008 | Chakravarti et al. | 524/147 |
| 2008/0119617 A1 | * | 5/2008 | Chakravarti et al. | 525/439 |
| 2008/0161507 A1 | * | 7/2008 | Chakravarti et al. | 525/439 |
| 2008/0269399 A1 | * | 10/2008 | Chakravarti et al. | 524/513 |

FOREIGN PATENT DOCUMENTS

| | | | |
|---|---|---|---|
| EP | 1 724 110 | * | 11/2006 |
| EP | 1724100 A1 | | 11/2006 |
| JP | 2000-191804 | * | 7/2000 |
| JP | 2002-003620 | * | 1/2002 |
| WO | 9963002 A1 | | 12/1999 |

* cited by examiner

MULTILAYER ARTICLES AND METHODS FOR MAKING MULTILAYER ARTICLES

BACKGROUND

In-mold decorated thermoplastic films are gaining wide acceptance in applications such as household consumer electronics, appliances, and printed overlays. These applications demand a combination of properties such as clarity, printability, thermoformability, and hardness, as well as scratch, chemical, and impact resistance. This combination is not attainable with many materials of choice. The most common solution has been to apply a functional coating as a cap layer on thermoplastic films, wherein the coating offers the surface properties while the base film provides the bulk mechanical integrity. However, while a coating improves scratch resistance, it takes away the films thermoformability, which seriously restricts the useful applications for such a film. One of the most difficult challenges is the balance between scratch resistance and thermoformability remains.

Therefore, there remains a need in the art for multilayer sheets that can be easily formed, e.g., via coextrusion, and which provide the desired combination of properties, including thermoformability and scratch resistance.

BRIEF SUMMARY

The present disclosure is generally directed to thermoformable materials, methods for making thermoformable sheets, and articles made therefrom. In one embodiment, the sheet, comprises: a cap layer comprising an acrylic polymer; and a base layer, wherein the sheet is thermoformable. The base layer comprises a cycloaliphatic polyester copolymer and an optionally, an aromatic polycarbonate. The cycloaliphatic polyester copolymer can comprise greater than 10 wt % cycloaliphatic diol or acid or combination thereof, based upon a total weight of the cycloaliphatic polyester copolymer.

In one embodiment, a method for making an article can comprise: melting an acrylic polymer in an extruder, forming a molten cycloaliphatic polyester copolymer in an extruder, and coextruding the acrylic polymer and the cycloaliphatic polyester copolymer to form a sheet. The cycloaliphatic polyester copolymer can comprises an amount of greater than 10 wt % cycloaliphatic polyester, based upon a total weight of the cycloaliphatic polyester copolymer. The cycloaliphatic polyester copolymer can form a base layer and the acrylic polymer forms a cap layer on the base layer.

The disclosure can be understood more readily by reference to the following detailed description of the various features of the disclosure and the examples included therein.

BRIEF DESCRIPTION OF THE DRAWINGS

Refer now to the figures, which are merely illustrative, not limiting.

DETAILED DESCRIPTION

Figure 1:
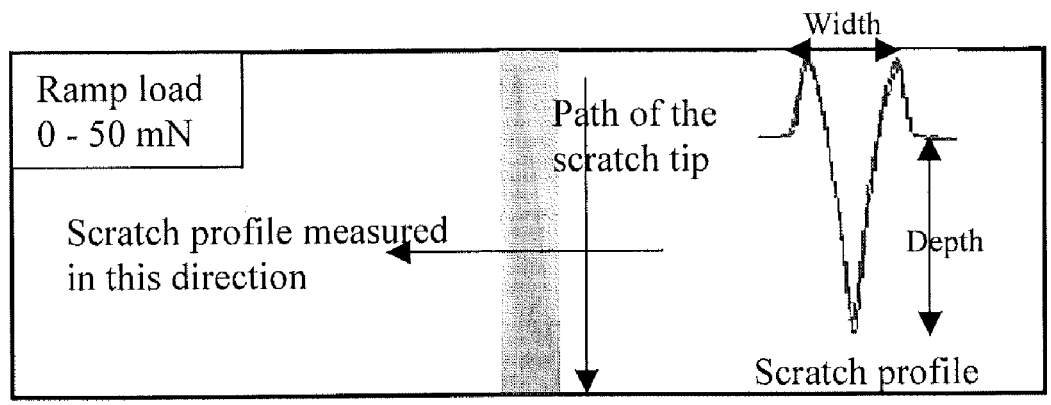
FIG. 1 is a cross-sectional illustration of a scratch created by a profile load.

Multilayer articles comprising a cap layer and a base layer. The cap layer can be based on acrylic polymers such as those of alkyl(meth)acrylates (e.g., poly(methyl methacrylate ("PMMA")), while the base layer can be a combination of a cycloaliphatic polyester copolymer and an optional aromatic polycarbonate. The cap layer and base layer can be coextruded to form a multilayer sheet.

Hardness, scratch resistance, mechanical strength, and thermoformability of such articles should enable these articles to meet a desired combination of properties such as clarity, printability, thermoformability, and hardness, as well as scratch, chemical, and impact resistance. Additionally, the base layer adheres to the cap layer without the need for any adhesive or a tie layer, and provides a substantial rheology match between the cap layer and the base layer, thereby improving the processability of the composite film.

In one embodiment, the sheet, comprises: a cap layer comprising an acrylic polymer; and a base layer, wherein the sheet is thermoformable. The base layer comprises a cycloaliphatic polyester copolymer and an optionally, an aromatic polycarbonate. The cycloaliphatic polyester copolymer can comprise greater than 10 wt % cycloaliphatic diol or acid or combination thereof, based upon a total weight of the cycloaliphatic polyester copolymer. The cap layer can be 1% to 50% of overall thickness and the overall thickness can be 5 mil to 500 mil. The base layer can comprise a blend of 25 wt % to 100 wt % cycloaliphatic polyester, balance polycarbonate, or, specifically, 50 wt % to 90 wt % cycloaliphatic polyester, balance polycarbonate. The sheet can have a pencil hardness greater than HB. The sheet having the a pencil hardness greater than HB can further comprise a tear initiation strength of greater than or equal to 120 N/mm and/or a tear propagation strength above 5 N/mm, and/or a tensile strength greater than 40 MPa. The acrylic polymer can be an alkyl(meth)acrylate, or, specifically, poly(methyl)methacrylate. The base layer can comprise 20 wt % to 90 wt % PCCD, balance aromatic polycarbonate.

In one embodiment, a method for making an article can comprise: melting an acrylic polymer in an extruder, forming a molten cycloaliphatic polyester copolymer in an extruder, and coextruding the acrylic polymer and the cycloaliphatic polyester copolymer to form a sheet. The cycloaliphatic polyester copolymer can comprise an amount of greater than 10 wt % cycloaliphatic polyester, based upon a total weight of the cycloaliphatic polyester copolymer. The cycloaliphatic polyester copolymer can form a base layer and the acrylic polymer forms a cap layer on the base layer. The sheet can be thermoformed.

The cycloaliphatic polyesters have the formula:

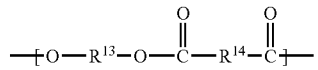

wherein $R^{13}$ and $R^{14}$ are independently at each occurrence an aryl, aliphatic or cycloalkane having 2 to 20 carbon atoms, with the proviso that at least one of $R^{13}$ and $R^{14}$ is a cycloaliphatic group. The cycloaliphatic polyester is a condensation product where $R^{13}$ is the residue of a diol or a chemical equivalent thereof and $R^{14}$ is residue of a diacid or a chemical equivalent thereof. In one embodiment, both $R^{13}$ and $R^{14}$ are cycloalkyl-containing groups. Such polyesters generally contain at least 50 mole % of cycloaliphatic diacid and/or cycloaliphatic diol components, the remainder, if any, being aromatic diacids and/or linear aliphatic diols.

In one embodiment $R^{13}$ and $R^{14}$ are cycloalkyl radicals independently selected from the following structural units:

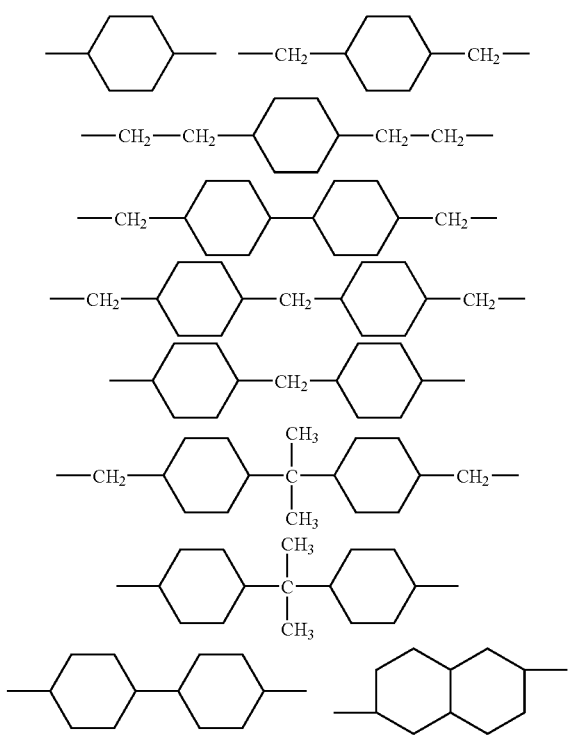

In a specific embodiment the diol is 1,4-cyclohexane dimethanol or a chemical equivalent thereof. Either or both of the cis or trans isomers of the 1,4-cyclohexane dimethanol can be used. Chemical equivalents to the diols include esters, such as $C_{1-4}$ dialkylesters, diaryl esters, and the like. Specific non-limiting examples of diacids include decahydro naphthalene dicarboxylic acids, norbornene dicarboxylic acids, bicyclo octane dicarboxylic acids, 1,4-cyclohexanedicarboxylic acid or the chemical equivalents thereof. Most specifically the diacids include trans-1,4-cyclohexanedicarboxylic acid or a chemical equivalent thereof. Chemical equivalents of these diacids include $C_{1-4}$ dialkyl esters, diaryl esters, anhydrides, salts, acid chlorides, acid bromides, and the like. In one embodiment the chemical equivalent comprises the dialkyl esters of the cycloaliphatic diacids, and most specifically the dimethyl ester of the acid, such as dimethyl-1,4-cyclohexane-dicarboxylate.

Other types of units can be present in the cycloaliphatic polyester copolymer, including units derived from the reaction of an aromatic carboxylic diacid component and a non-cycloaliphatic diol, or chemical equivalents thereof. Exemplary aromatic dicarboxylic acids include isophthalic acid, terephthalic acid, 1,2-di(p-carboxyphenyl)ethane, 4,4'-dicarboxydiphenyl ether, 4,4'-bisbenzoic acid, 1,4-, 1,5-, or 2,6-naphthalenedicarboxylic acids, and combinations comprising at least one of the foregoing acids. Specific dicarboxylic acids are terephthalic acid, isophthalic acid, and combinations comprising the two foregoing acids. The non-cycloaliphatic diol can be a $C_{1-4}$ alkylene glycol, for example ethylene glycol, propylene glycol, 1,4-butylene glycol, and the like, and combinations comprising at least one of the foregoing glycols.

The cycloaliphatic polyester copolymers more specifically comprise at least 50 mole % of the cycloaliphatic residues, more specifically at least 70 mole % of the cycloaliphatic residues, the remainder being the aromatic acid or $C_{1-4}$ alkylene glycol residues. A specific cycloaliphatic polyester is poly(cyclohexane-1,4-dimethylene cyclohexane-1,4-dicarboxylate), also referred to as poly(1,4-cyclohexanedimethanol-1,4-dicarboxylate) (PCCD). Another specific ester is poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) (PETG) wherein greater than 50 mol % of the ester groups are derived from ethylene (PETG). Also contemplated for use herein are any of the above polyesters with minor amounts, e.g., from 0.5 to 5 percent by weight, of units derived from aliphatic acid and/or aliphatic polyols to form copolyesters. The aliphatic polyols include glycols, such as poly(ethylene glycol) or poly(butylene glycol).

Aromatic polycarbonates are of the formula:

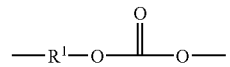

in which at least 60 percent of the total number of $R^1$ groups are an aromatic organic radical and the balance thereof are aliphatic, alicyclic, or aromatic radicals. The term "polycarbonate" as used herein includes copolycarbonates, that is, copolymers comprising two or more different $R^1$ groups. In one embodiment, each $R^1$ is derived from a bisphenol compound of the formula:

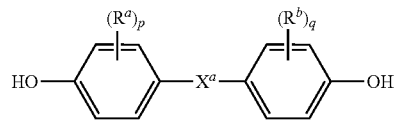

wherein $R^a$ and $R^b$ are each a halogen atom or a monovalent hydrocarbon group and can be the same or different; p and q are each independently integers of 0 to 4; and $X^a$ represents one of the groups of the formulas:

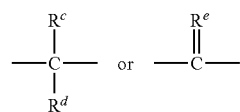

wherein $R^c$ and $R^d$ each independently represent a hydrogen atom or a monovalent linear or cyclic hydrocarbon group and $R^e$ is a divalent hydrocarbon group.

Specific examples of bisphenol compounds include 1,1-bis(4-hydroxyphenyl)methane, 1,1-bis(4-hydroxyphenyl) ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing bisphenol compounds can also be used. For example, copolymer can be used, comprising a mixture of units derived from bisphenol A and 1,1-bis(4-hydroxy-3-methylphenyl) cyclohexane.

In a specific embodiment, the polycarbonate is a linear homopolymer derived from bisphenol A, in which p and q are each zero, and $Y^1$ is isopropylidene.

The relative amount of the cycloaliphatic polyester component and aromatic polycarbonate components varies with the specific application. In one embodiment, the amount of the polyester component is in an amount of greater than 10 wt %, e.g., 25 wt % to 100 wt %, with the remainder being aromatic polycarbonate. In another embodiment, the amount of cycloaliphatic polyester is 50 wt % to 90 wt %, with the remainder being aromatic polycarbonate. The base layer composition is commercially available from GE Plastics as XYLEX®.

The cap layer can be based on acrylic polymers such as those of alkyl(meth)acrylates (e.g., poly(methyl methacrylate ("PMMA")). This layer can comprise greater than or equal to 50 wt % acrylic polymer, or, specifically, greater than or equal to about 70 wt % acrylic polymer, or, more specifically, greater than or equal to about 90 wt % acrylic polymer, based upon a total weight of the cap layer. The remainder can be any other polymer that, when blended with the acrylic polymer, results in a cap layer with a transmission of greater than or equal to 80% as is determined in accordance with ASTM D1003-00, Procedure A measured, e.g., using a HAZE-GUARD DUAL from BYK-Gardner, using and integrating sphere (0°/diffuse geometry), wherein the spectral sensitivity conforms to the CIE standard spectral value under standard lamp D65.

In addition to the above materials, the base layer and/or cap layer can, independently, include various additives, with the proviso that the additives are selected so as to not significantly adversely affect the desired properties of the layers, for example, thermoformability, scratch resistance, and so forth. Combinations of additive(s) can be used. Such additives can be mixed at a suitable time during the mixing of the components for forming the composition for each of the layers. Possible additive(s) include as anti-oxidants, flame retardants, drip retardants, dyes, pigments, colorants, stabilizers (e.g., thermal, ultraviolet, and so forth), small particle mineral (such as clay, mica, and/or talc), antistatic agents, plasticizers, lubricants, mold release agents, whitening agents, reinforcing fillers (e.g., glass), and combinations comprising at least one of the foregoing. The amount of additive(s) can be less than or equal to about 20 wt %, or, specifically, about 0.1 wt % to about 10 wt % additive(s), or, more specifically, about 0.5 wt % to about 5 wt % additive(s), based upon a total weight of the layer comprising the additive(s).

The present cap layer and base layer are formed by coextrusion. For example, the multi-layer composite can be suitably formed using a continuous calendaring co-extrusion process as shown schematically in FIG. 2. In this process, single screw extruders 1 and 2 supply resin melts for the individual layers (i.e., the top layer, the second layer and any additional polymeric layers) into a feed block 3. A die 4 forms a molten polymeric web that is fed to a 3 roll-calendaring stack 5. Typically, the calendaring stack comprises 2 to 4 counter-rotating cylindrical rolls with each roll, individually, made from metal (e.g., steel) or rubber coated metal. Each roll can be heated or cooled, as is appropriate. The molten web formed by the die can be successively squeezed between the calendaring rolls. The inter-roll clearances or "nips" through which the web is drawn determines the thickness of the layers. The multi-layer composite may also be formed from separate pre-formed films corresponding to the polymeric layers which are subsequently laminated together, for example using heated rolls and optionally adhesive tie layers.

The layers can be coextruded to form various cap layer to base layer thickness ratios (i.e., cap layer thickness divided by base layer thickness). The thickness ratio can be 1% to 50%, or, specifically, 5% to 40%, or, more specifically, 10% to 25%. Generally, the overall thickness of the sheet can be up to and even exceeding several millimeters. More specifically, the sheet can have a thickness (e.g., gage) of 1 mil (25.4 micrometers (μm)) to 500 mils (1,2700 μm), or, yet more specifically, about 5 mils (127 μm) to about 40 mils (1016 μm), and yet more specifically, about 5 mils (127 μm) to about 30 mils (762 μm).

The following examples are merely exemplary, not limiting.

EXAMPLES

Example 1

Figure 2:
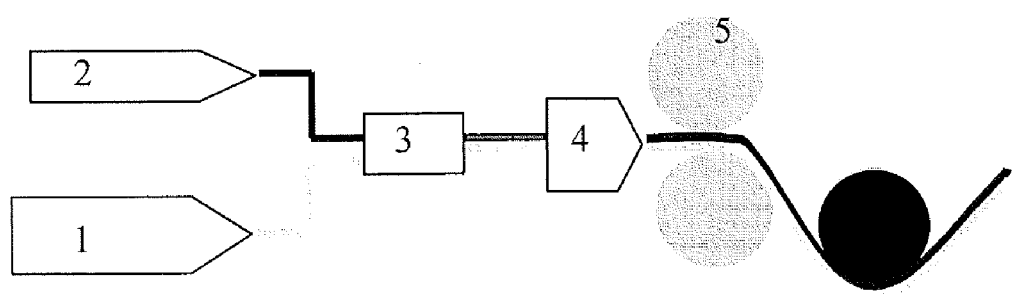
FIG. 2 is a schematic of an exemplary co-extrusion system.

Bilayer films of varying cap layer compositions and film constructions (Samples 1 through 13 in Table 2) were prepared using the coextrusion method described in relation to FIG. 2. The specific process parameters for each sample varied with individual layer thicknesses and the overall film thickness, the range of process parameters encompassing all samples in Table 2 is given in Table 3. It is understood that the process window for extruding these films is not restricted to that listed in Table 3. An objective of this experiment was to determine whether or not there exists "a" condition at which these coextruded films could be made, i.e. whether or not these films are extrudable. Table 3 merely provides one set of conditions for co-extruding these films.

This example demonstrates the suitability of the disclosed articles for in mold decoration (IMD) applications. Films for such applications should be amenable to the three sub-processes of IMD: (a) extrudability—ability to make films out of the selected materials, at a surface quality comparable to commercially available polished graphic films (e.g., Lexan 8010 film); (b) formability—ability to draw the films into different geometries; and (c) trimming—ability to cut the film cleanly without inducing any cracking or delamination.

Table 1 contains the chemical description and the source of the resins used in the film constructions set forth in Table 2

TABLE 1

| Component | Chemical Description | Source/Vendor |
| --- | --- | --- |
| PC | Polycarbonate resin (Mw[1] = 25,000 g/mol, PS standards[2]) | SABIC Innovative Plastics, Pittsfield, MA |
| PCTG | Poly(20 mole % ethylene terephthalate)-co-(80 mole % 1,4 cyclohexanedimethylene terephthalate) (Mw = 70,000 g/mol, PS standards) | Eastman Chemical, Kingsport, Tenn. |
| PCCD | Poly(1,4-cyclohexanedimethylene terephthalate) 1,4-cyclohexanedimethanol | Eastman Chemical Kingsport, Tenn. |
| PMMA | Poly(methyl methacrylate) | Arkema Philadelphia, PA |

[1]Mw = weight average molecular weight
[2]PS standards = as measured by gel permeation chromatography (GPC)

Table 2 evaluates the samples along the above 3 attribute metrics: surface quality, thermoformability, and trimming. To measure surface quality, 10 pieces of size 12 inches×12 inches (30.5 cm×30.5 cm) were examined by 3 operators to identify any imperfection (lines, dents, bumps) of length scales greater than 2 mm. Absence, to the unaided eye, of any such imperfection was considered a "pass". It was not intended to test the optical quality of the films, but instead meant to identify any gross imperfections suggesting any issues with film co-extrusion.

To test the formability 12 inches×12 inches specimens of the film were preheated to 140° C. and then vacuum formed on a COMET Thermoformer, with the male forming tool at 120° C., a minimum curvature of 5 mm, and maximum draw of 10 mm. A "pass" on this test is absence of any wrinkle, whitening, or tear on the film during the process as determined with an unaided eye. (The unaided eye excludes the use of optical devices for magnification with the exception of corrective lenses needed for normal eyesight.)

The formed parts were trimmed using matched metal dies comprising hardened male and female die halves (American Iron and Steel Institute "AISI" Type A2 steel), with a clearance between the male die half and female die half of 10% of sheet thickness; wherein the part is at a 90 degree angle to the blade at the time of impact. Trimming the thermoformed part is an integral step in the IMD process. Multilayer structures with poor interlayer adhesion tend to delaminate during this step. A pass on this test is absence of any visible signs of cracking and any visible delamination during this step, with visibility determined with an unaided eye.

more, based upon a total weight of the base layer, e.g., to facilitate coextrusion. While 100% PCTG as the base layer was extrudable, PCCD was blended with PC to enable extrusion. Hence, if PCCD is employed, the base layer can comprise 20 wt % to 90 wt % PCCD, or, specifically, 30 wt % to 80 wt % PCCD, or, more specifically, 40 wt % to 60 wt % PCCD, balance PC. Additionally, the cap thickness can be 1% to 50%, or, specifically, 5% to 40%, or, more specifically 10% to 30%, and yet more specifically, 15% to 25%.

Example 2

This example demonstrates hardness and scratch resistance of the multilayer film. Two samples were prepared in accordance with the film and resin composition set forth in Table 4. These samples were prepared the same way as those of Example 1. Sample 14 is essentially a monolayer film, included in this comparison to highlight the performance improvement brought about by the cap layer.

TABLE 2

| No. | Cap % | Base layer Composition | Surface Quality | Formability (>10 mm draw) | Trimming (Cracking/ delamination) | Pencil Hardness (ASTM D3363-05) |
|---|---|---|---|---|---|---|
| 1 | 0 | 60/40 PCTG/PC | Pass | Pass | Pass | 2B |
| 2 | 10 | 60/40 PCTG/PC | Pass | Pass | Pass | 2H |
| 3 | 30 | 60/40 PCTG/PC | Pass | Pass | Pass | 3H |
| 4 | 50 | 60/40 PCTG/PC | Pass | Pass | Fail | 4H |
| 5 | 20 | 0/100 PCTG/PC | Pass | Pass | Fail | 2H |
| 6 | 10 | 0/100 PCTG/PC | Fail | Fail | Fail | — |
| 7 | 20 | 25/75 PCTG/PC | Pass | Pass | Pass | 2H |
| 8 | 20 | 80/20 PCTG/PC | Pass | Pass | Pass | 2H |
| 9 | 20 | 100/0 PCTG/PC | Pass | Pass | Pass | 2H |
| 10 | 10 | 30/70 PCCD/PC | Pass | Pass | Pass | H |
| 11 | 10 | 60/40 PCCD/PC | Pass | Pass | Pass | 2H |
| 12 | 10 | 80/20 PCCD/PC | Pass | Pass | Pass | H |
| 13 | 10 | 100/0 PCCD/PC | Fail | Fail | Fail | — |

TABLE 3

| | |
|---|---|
| Main Extruder diameter | 1.75 inches |
| Coextruder Diameter | 1.25 inches |
| Main Extrude End Zone Temp (° F.) | 479° to 491° |
| Coextruder End Zone Temp (° F.) | 463° to 476° |
| RPM (Main/Co-ex) | (46.5 to 50.5)/(4.4 to 6.7) |
| Die Temp (° F.) | 506° to 510° |
| Roll Temp (Top/Bottom) (° F.) | (198° to 209°)/(205° to 216°) |

Table 2 leads to the following conclusions: (1) coextruded films show a marked improvement in hardness, even 10% cap takes the hardness upward of H; (2) while increasing the cap thickness improves the pencil hardness, it makes the film brittle as is seen from the trimming performance (Sample 4, while it exhibited a pencil hardness of 4H, cracked during the trimming process, and hence is unsuitable for IMD); (3) polyester in the base layer makes the film IMD friendly (100% PC in the base layer poses challenges for coextrusion with the cap layer. At 10% cap thickness (Sample 6), the film could not be extruded, while the film did get coextruded at a higher cap to base ratio (Sample 5), it failed the trimming test wherein it led to delamination between the cap and base layers; and (4) depending on the type of polyester, blending with PC may be useful, e.g., in a weight ratio of 0% to 20% or

TABLE 4

| No. | Cap % | Base layer Composition |
|---|---|---|
| 14 | 0 | 60/40 PCTG/PC |
| 15 | 10 | 60/40 PCCD/PC |
| 16 | 10 | 60/40 PCTG/PC |

The two samples were compared to three commercially available samples for graphic applications: a 2 layer coextruded polycarbonate film where the cap is a PC copolymer while the base is PC (specifically Lexan ML 9735 commercially available from SABIC Innovative Plastics, Pittsfield, Mass.) (Sample 17) (known as 1HD00, commercially available from SABIC Innovative Plastics); a monolayer polycarbonate (Sample 18) polycarbonate (Lexan 8010, commercially available from SABIC Innovative Plastics); and a coated polycarbonate film (Sample 19) comprising a curable silica coating on a base of polycarbonate (specifically Lexan 8010) (known as HP92S, commercially available from SABIC Innovative Plastics), all commercially available from SABIC Innovative Plastics. It must be noted that HP92S is a coated film which is not formable.

All samples were tested for hardness, namely pencil hardness according to ASTM D3363-05. Both of Samples 15 and 16 had a pencil hardness of 2H, while Samples (17, 18, 19) had lower hardness: 1H, 2B, and HB, respectively. Sample 14 had a hardness of 2B, which highlights the significance of the cap layer.

The samples were also tested for scratch resistance using an Erichsen Scratch Tester Type 413, which complies with ISO 1518. Forces of 2 Newtons (N) and 4N were applied to a conical stylus with radius of 0.01 millimeter (mm), which result in an indentation being made on the part surface. The extent of the indentation is subsequently measured by a Dektak 6M profilometer and is reported as the height of the indentation measured from the bottom of the indentation to the sample surface. Again, Samples 15 and 16 outperformed the comparative samples. Sample 15 and 16 had scratch depths of 1.15 micrometers (μm) and 1.25 μM, respectively. The comparative samples had scratch depths of 1.4 μm, 2.86 μm, and 2.95 μm, respectively. The sample without any cap layer (Sample 14) had a scratch depth of 3.02 micrometers (μm).

The data generated in Samples 14-16 was generated under heavy loading. In yet another instance as shown in Table 5, micro-scratch tests (light loading) were performed with a Nano Indenter XP, MTS Systems, applying a normal load ramping from 0 to 50 milliNewtons (mN). The scratch velocity was 50 micrometers per second (μm/s). A standard Berkovich diamond indenter (with 10 nanometer (nm) radius tip) was used which was moved edge forward through the material. FIG. 1 is an illustration of one such scratch and the corresponding measured cross profile showing the build-up around the scratch. Reported below are the instantaneous depth (depth during) of the profile at the point when the load reaches 25 mN. This gives a measure of softness/hardness of the material. By the time the entire scratch is made (load reaches 50 mN), some of the disturbed material along the scratch has recovered, as a result of which the scratch depth reduces. The depth and width of the scratch is measured again at the same point as above. This is "depth after". This gives a measure of recovery ("forgiveness") of the material.

TABLE 5

| Property | Sample 14 | Sample 15 | Sample 16 | 1HD00 (Sample 17) | Lexan 8010 (Sample 18) | HP92S (Sample 19) |
|---|---|---|---|---|---|---|
| Width (μm) | 33.31 | 22.067 | 22.087 | 26.352 | 32.477 | 25.21 |
| Depth-during (nm) | 4872 | 3735 | 3725 | 4167 | 4690 | 4925 |
| Depth-after (nm) | 1921 | 1090 | 1130 | 1320 | 1875 | 955 |

Table 5 further emphasizes the scratch resistance improvement resulting from the bilayer construction (samples 14 vs. 15/16). Not only do samples 15 and 16 perform better than Samples 17 and 18, they are also comparable to the coated comparative sample HP92S (Sample 19). This is unexpected since one would have expected the coatings, by virtue of their cross-linking, to be much more resistant under such light loading In addition to scratch resistance and hardness, mechanical robustness is also a factor for IMD applications; e.g., the film should be resistant to cracks and tears, Table 6 reports the tear initiation and propagation strengths in Newtons per millimeter (N/mm) as measured using ASTM D1004-03, D1938-02, and ASTM D882, respectively.

TABLE 6

| Property | Sample 15 | Sample 16 | 1HD00 (Sample 17) | Lexan 8010 (Sample 18) | HP92S (Sample 19) |
|---|---|---|---|---|---|
| Tear Initiation Strength (N/mm) | 206.1 ± 10.1 | 171.8 ± 26.3 | 234.29 ± 7.4 | 241.19 ± 11.2 | 258.41 ± 6.7 |
| Tear Propagation Strength (N/mm) | 15.48 ± 0.84 | 15.12 ± 2.9 | 10.05 ± 0.77 | 9.2 ± 0.8 | 10.52 ± 0.6 |
| Tensile Strength at break (MPa) | 60.08 | 62.4 | 60.7 | 58.6 | 59.3 |

It is evident from Table 6 that the improved scratch resistance and hardness as seen in the previous examples, did not compromise the mechanical properties of the articles.

Ranges disclosed herein are inclusive and combinable (e.g., ranges of "up to about 25 wt %, or, more specifically, about 5 wt % to about 20 wt %", is inclusive of the endpoints and all inner values of the ranges of "about 5 wt % to about 25 wt %," etc.). "Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments. As used herein, the term "(meth)acrylate" encompasses both acrylate and methacrylate groups. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sheet, comprising:
   a cap layer comprising an acrylic polymer, wherein the cap layer is 10% to 30% of an overall thickness and the overall thickness is 5 mil to 500 mil; and
   a base layer comprising a cycloaliphatic polyester copolymer and an aromatic polycarbonate, wherein the cycloaliphatic polyester copolymer is poly(1,4-cyclohexylene dimethylene co-ethylene terephthalate);
   wherein the cap layer and base layer were coextruded to form the sheet which is thermoformable;
   wherein the sheet has a pencil hardness greater than or equal to 2H; and
   wherein the sheet has a tear propagation strength above 5 N/mm.

2. The sheet of claim 1, wherein the blend comprises 50 wt % to 90 wt % cycloaliphatic polyester, balance polycarbonate.

3. The sheet of claim 1, wherein the sheet has a tear initiation strength of greater than or equal to 120 N/mm.

4. The sheet of claim 1, wherein the sheet has a tensile strength greater than 40 MPa.

5. The sheet of claim 1, wherein the acrylic polymer is an alkyl(meth)acrylate.

6. The sheet of claim 5, wherein the cap layer is poly(methyl)methacrylate.

7. The sheet of claim 1, wherein the cap layer is 10% to 25% of the overall thickness.

8. The sheet of claim 1, wherein the cap layer is on and in contact with the base layer.

9. The sheet of claim 1, wherein the overall thickness is 5 mil to 40 mils.

10. A method for making an article, comprising:
    melting an acrylic polymer in an extruder;
    forming a molten mixture comprising a cycloaliphatic polyester copolymer and an aromatic polycarbonate in an extruder, wherein the cycloaliphatic polyester copolymer is poly(1,4-cyclohexylene dimethylene co-ethylene terephthalate);
    coextruding the acrylic polymer and the molten mixture to form a sheet which is thermoformable, wherein the molten mixture forms a base layer and the acrylic polymer forms a cap layer on the base layer;
    wherein the cap layer is 10% to 30% of an overall sheet thickness;
    wherein the sheet has a pencil hardness greater than or equal to 2H; and
    wherein the sheet has a tear propagation strength above 5 N/mm.

11. The method of claim 10, further comprising thermoforming the sheet.

12. The method of claim 10, wherein the acrylic polymer comprises an alkyl(meth)acrylate.

13. The method of claim 12, wherein the alkyl(meth)acrylate comprises poly(methyl)methacrylate.

14. The method of claim 10, wherein the cap layer is 10% to 25% of the overall thickness.

15. The method of claim 10, wherein the overall thickness is 5 mil to 40 mils.

16. The method of claim 10, wherein the cap layer is coextruded on and in contact with the base layer.

* * * * *